US010877158B2

(12) United States Patent
Grant et al.

(10) Patent No.: US 10,877,158 B2
(45) Date of Patent: Dec. 29, 2020

(54) SYSTEM AND METHOD FOR GENERATING EXTENDED SATELLITE EPHEMERIS DATA

(71) Applicant: MYRIOTA PTY LTD, Adelaide (AU)

(72) Inventors: Alexander James Grant, Adelaide (AU); Robert George McKilliam, Adelaide (AU)

(73) Assignee: MYRIOTA PTY LTD, Adelaide Sa (AU)

(*) Notice: Subject to any disclaimer, the term of this patent is extended or adjusted under 35 U.S.C. 154(b) by 0 days.

(21) Appl. No.: 16/472,176

(22) PCT Filed: Dec. 21, 2017

(86) PCT No.: PCT/AU2017/000286
§ 371 (c)(1),
(2) Date: Jun. 20, 2019

(87) PCT Pub. No.: WO2018/112502
PCT Pub. Date: Jun. 28, 2018

(65) Prior Publication Data
US 2019/0353799 A1 Nov. 21, 2019

(30) Foreign Application Priority Data

Dec. 22, 2016 (AU) ................................. 2016905314

(51) Int. Cl.
*G01S 19/27* (2010.01)
*H04B 7/195* (2006.01)
*H04B 7/185* (2006.01)
(52) U.S. Cl.
CPC ............ *G01S 19/27* (2013.01); *H04B 7/1851* (2013.01); *H04B 7/195* (2013.01)
(58) Field of Classification Search
CPC ........... B64G 1/242; B64G 3/00; G01S 19/27; H04B 7/1851; H04B 7/195
(Continued)

(56) References Cited

U.S. PATENT DOCUMENTS 6,241,194 B1 * 6/2001 Heiberg ................. B64G 1/283
244/165
7,064,706 B2 * 6/2006 King ....................... G01S 19/05
342/357.44
(Continued)

FOREIGN PATENT DOCUMENTS

WO 2009/059429 A1 5/2009

OTHER PUBLICATIONS

Hoots et al., "Models for propagation of NORAD element sets," Spacetrack Report No. 3, Dec. 1980, 105 pages.
(Continued)

*Primary Examiner* — Tan H Trinh
(74) *Attorney, Agent, or Firm* — Seed Intellectual Property Law Group LLP

(57) ABSTRACT

A method and system for generating extended satellite ephemeris data for a satellite for use by a terminal apparatus is described. Historical orbital parameter data (e.g. from historical TLEs) are used to build a predictor for future values of the orbital parameters. The orbital parameter prediction model is then stored on the terminal apparatus (or an existing model can be updated), and at a desired epoch the pre-stored orbital parameter predictor is used to produce estimates of the orbital parameters for the satellite for that epoch (ie synthetic or predicted TLEs). These predicted orbital parameters (predicted TLE) are then used as input to a standard orbit predictor to produce an estimate of the satellite's location, for example to determine satellite pass times. This method allows generation satellite ephemeris data which is valid out to a year or more as compared to the normal validity of ephemeris data of a few hours or days.

27 Claims, 7 Drawing Sheets

(58) Field of Classification Search
USPC ............... 455/12.1, 427, 456.1; 342/357.31, 342/357.42, 357.64; 244/158.6, 165
See application file for complete search history.

(56) References Cited

U.S. PATENT DOCUMENTS

| | | | | |
|---|---|---|---|---|
| 8,228,230 B1* | 7/2012 | Capozio | ............... | G01S 19/27 342/357.66 |
| 9,236,967 B1* | 1/2016 | Mustiere | ............... | H04J 3/0661 |
| 10,090,808 B1* | 10/2018 | Henzler | ............... | H03F 1/0216 |
| 2002/0036250 A1* | 3/2002 | Ebert | ............... | B64G 1/242 244/158.6 |
| 2006/0055598 A1* | 3/2006 | Garin | ............... | G01S 19/05 342/357.64 |
| 2007/0273581 A1* | 11/2007 | Garrison | ............... | G01S 19/05 342/357.42 |
| 2007/0282910 A1* | 12/2007 | Diggelen | ............... | B64G 1/1014 |
| 2007/0299609 A1* | 12/2007 | Garin | ............... | G01S 19/05 701/530 |
| 2008/0024361 A1* | 1/2008 | Diggelen | ............... | G01S 19/05 342/357.42 |
| 2008/0111738 A1* | 5/2008 | Han | ............... | G01S 19/27 342/357.66 |
| 2008/0238765 A1 | 10/2008 | Zhang et al. | | |
| 2009/0237302 A1* | 9/2009 | Derbez | ............... | G01S 19/05 342/357.66 |
| 2009/0284413 A1* | 11/2009 | Yule | ............... | G01S 19/27 342/357.42 |
| 2009/0303122 A1 | 12/2009 | Weng | | |
| 2010/0060518 A1* | 3/2010 | Bar-Sever | ............... | G01S 19/27 342/357.66 |
| 2010/0194634 A1* | 8/2010 | Biacs | ............... | G01S 19/23 342/357.31 |
| 2010/0321236 A1* | 12/2010 | Diggelen | ............... | G01S 19/27 342/357.66 |
| 2011/0273329 A1* | 11/2011 | Weng | ............... | G01S 19/27 342/357.31 |
| 2013/0252631 A1* | 9/2013 | Alizadeh-Shabdiz | ............... | H04W 4/025 455/456.1 |
| 2014/0002304 A1* | 1/2014 | Wei | ............... | G01S 19/27 342/357.66 |
| 2014/0132447 A1* | 5/2014 | Derbez | ............... | G01S 19/27 342/357.66 |
| 2015/0070211 A1* | 3/2015 | Cheng | ............... | G01S 19/27 342/357.51 |
| 2015/0362597 A1* | 12/2015 | Syrjarinne | ............... | G01S 19/20 342/357.58 |
| 2016/0131764 A1* | 5/2016 | Chan | ............... | B64G 1/242 342/357.42 |
| 2017/0249649 A1* | 8/2017 | Garvey | ............... | G06F 17/18 |
| 2019/0058522 A1* | 2/2019 | Haley | ............... | G06F 16/23 |

OTHER PUBLICATIONS

Theil, "A rank-invariant method of linear and polynomial regression analysis I and II," Koninklijke Nederlandse Akademie Van Wetenschappen, 1950, 16 pages.

Gupta et al., "Short-Term Orbit Prediction with $J_2$ and Mean Orbital Elements," *International Journal of Astronomy and Astrophysics*, 1:135-146, 2011. (12 pages).

* cited by examiner

SYSTEM AND METHOD FOR GENERATING EXTENDED SATELLITE EPHEMERIS DATA

CROSS REFERENCE TO RELATED APPLICATION

The present application claims priority from Australian Provisional Patent Application No. 2016905314 titled "SYSTEM AND METHOD FOR GENERATING EXTENDED SATELLITE EPHEMERIS DATA" and filed on 22 Dec. 2016, the content of which is hereby incorporated by reference in its entirety.

BACKGROUND

Technical Field

The present disclosure relates to satellite orbits. In a particular form the present disclosure relates to methods for generating satellite ephemeris data.

Description of the Related Art

Artificial satellites in orbit around the Earth can be used for telecommunications and positioning applications. In such systems, devices located on, or near the surface of the Earth receive signals from, or transmit signals to satellites. In many of these applications it is necessary to know the precise position of the satellite in its orbit. For example, the Global Positioning System (GPS) relies on being able to determine the position of its satellites so precisely that relativistic effects need to be taken onto account. In some telecommunications applications, a highly directional (possibly steerable) antenna must be pointed at the satellite.

In other applications, the precise position of the satellite is not required, rather the timing of each satellite pass must be predicted. A satellite pass refers to a time period during which the satellite is useful to a ground-based observer. For example, this might be a time interval during which the satellite is above some minimum elevation angle with respect to the observer.

A key requirement for many satellite communications and positioning systems is for a ground-based device to be able to predict satellite passes. For GPS systems, knowing the pass times for each satellite allows the GPS receiver to know which satellites to look for at any particular time allowing the GPS receiver to rapidly acquire and lock onto to a satellite which reduces the time to first fix. That is the GPS receiver is able to use this information to rapidly produce a position estimate to a user (or user device). Many assisted GPS system focus on reducing the time to first fix to as short as possible (eg seconds or less) in order to improve the user experience (ie by reducing latency).

For a communications system, knowing the pass times allows the transceiver device to know which satellite to communicate with, and at what time. In such systems the time to first fix is less critical, although it is generally desirable that the time to first fix is not tens of minutes to hours as this will generally waste power.

Existing methods for estimating pass times are based on orbit prediction algorithms, which use ephemeris data (or orbital elements), typically two-line elements (TLE), to model the orbit of a satellite. The SGP4 algorithm (Felix R. Hoots and Ronald L. Roehrich, "Models for propagation of NORAD element sets", Technical Report 3, Spacetrack, 1988) is one example of an orbit prediction algorithm which is designed for use with TLE data.

These methods can provide a very accurate prediction of the position of the satellite, and pass timing. However it is well established that these methods only work if the TLE data is not too old. The standard SGP4 predictor used with TLE data becomes very inaccurate one the TLE data is more than about one month old. This inaccuracy can be due to two main effects: (a) orbital drift and (b) inaccuracy of the predictor itself.

The orbital parameters of a satellite may change over time (either due to natural forces, or due to external control of the satellite). Some satellites are in tightly controlled orbits, expending propellant in order to stay "on orbit". For example the orbits of GPS satellites in Medium Earth Orbits (MEO) are constantly monitored and frequently adjusted (eg time scale of every weeks to every few months) to keep the satellites in desired orbits.

Other satellites may be uncontrolled or only weakly controlled. We will collectively refer to such satellites as minimally controlled satellites. This is often the case for smaller satellites in Low Earth Orbits which do not carry large amounts of propellant, and reserve maneuvering operations for collision avoidance, rather than station-keeping purposes.

Sun synchronous orbits are designed such that the satellite always passes directly over the equator (or indeed any point on the surface of the Earth) at the same local solar time. These orbits are designed with a precisely chosen combination of inclination (typically near-polar) and altitude such that the asphericity of the earth causes the orbit to precess exactly once per year. In practice, this won't be exact, and an uncontrolled orbit will drift from the intended plane.

FIG. 1 plots a curve 1 of the mean local time of ascending node (MLTAN) for a small satellite nominally in sun synchronous orbit (obtained from historical TLE data). The horizontal axis shows the number of days since launch. The vertical axis shows the mean local time of ascending node, expressed in UTC hours. Although the orbit is designed to be sun synchronous, its orbital plane drifts by approximately one hour per year. Using out of date TLE data for scenarios such as these results in inaccurate predictions. For the example in FIG. 1, a TLE one year out of date would result in errors of at least one hour. Thus a ground terminal attempting to acquire or communicate with the satellite would either waste 1 hour of power attempting to acquire the satellite whilst it was not in view, or it may transmit a message erroneously expected the satellite to receive the message, in which case the message may be lost, or power may be wasted attempting to retransmit the message. Frequently power is a precious commodity for satellite terminals.

In contrast, FIG. 2 plots a curve of the mean local time of ascending node (MLTAN) for a satellite in a controlled sun synchronous orbit. The variation of the orbital plane is only a few minutes as compared to around 4 hours in FIG. 1 after around 4 years (note the difference in scale of the Figures).

Looking beyond orbital drift, the SGP4 prediction algorithm itself will produce inaccurate results when used on "stale" TLE data, even for a stable orbit. For example, the controlled-orbit satellite shown in FIG. 2 varies its orbital plane by about 40 seconds per month. However using a six-month out of date TLE with SGP4 results in pass timing inaccuracies exceeding one hour.

Satellite system currently solve this problem by regularly observing the position and dynamics of the satellite, and producing updated TLE data (several times per day) and regularly transmitting updated data to the devices on the ground which need the latest TLE's. For example in the GPS system satellites broadcast a new ephemeris every 2 hours which is valid for 4 hours, and all satellites continuously transmit the complete almanac containing all ephemeris data as part of its frame structure (with the complete almanac taking 12.5 minutes to download from a satellite).

However transmitting updated ephemeris data assumes the existence of a communications link (or links) to the device to be updated. For example in the GPS system the ephemeris may be obtained from a GPS satellite, or in an assisted GPS system this may be provided by a ground based transmitter or over another data link. However in many satellite communications systems communications to the device (terminal) may be expensive, unavailable or otherwise undesirable. Thus in some applications, it may be of interest to extend the period during which reasonably accurate estimates of satellite pass timing can be found. These include:

1.) Systems with low bandwidth or intermittent communications links where it may be difficult of impossible to regularly update ephemeris data;
2.) Systems with no ability to remotely update ephemeris data, e.g. one-way communications devices;
3.) Systems where the cost of regularly updating ephemeris data is too high, either in terms of data communications cost, battery use or other costs; and
4.) Systems that may be susceptible to jamming or spoofing of ephemeris data transmitted to devices.

There is thus a need to provide a system and method for generating extended satellite ephemeris data to allow terminal devices to store or generate ephemeris data for months or longer before it needs to be updated, or to at least provide an alternative to current systems and methods.

SUMMARY

Embodiments described herein can be used to accurately predict satellite pass times for much longer time frames than currently possible using current TLEs and orbital predictors such as SGP4. The method can be implemented in a satellite terminal provided with historical ephemeris data for a satellite, or it can be distributed across a communication system in which a computing apparatus estimates a dynamical orbital model historical ephemeris data, and this dynamical orbital model is provided to a satellite terminal. The terminal uses the dynamical orbital model to generate synthetic orbital elements at a desired time (ie when it would like to schedule a wake up time to transmit or receive from the satellite), and these synthetic orbital elements (eg synthetic TLE) are then passed to an orbital predictor, such as a standard orbital predictors like SGP4.

According to a first aspect, there is provided a method for generating extended satellite ephemeris data for a satellite for use by a terminal apparatus, wherein the satellite is a minimally controlled satellite, the method comprising:

receiving historical ephemeris data for a satellite, wherein the satellite is a minimally controlled satellite;

estimating a dynamical orbital model for generating estimates of a temporal evolution of a set of orbital parameters for the satellite using the received historical ephemeris data;

providing the dynamical orbital model to a terminal apparatus, wherein the terminal stores the dynamical orbital model or updates a stored dynamical orbital model;

generating, by the terminal apparatus, a set of synthetic orbital elements at an epoch time using the dynamical orbital model; and the terminal apparatus providing the set of synthetic orbital elements to an orbital predictor to obtain an estimate of one or more satellite pass times for a predefined terminal position, or one or more satellite locations at a predetermined future time.

In one form, estimating of the dynamical orbital model is performed by a computing apparatus remote from the terminal apparatus, and the dynamical orbital model is transmitted or uploaded to the terminal apparatus.

The set of orbital parameters is any set of parameters sufficient to model the motion of a minimally controlled satellite in orbit, and the dynamical orbital model is configured to directly or indirectly fit each orbital parameter. In one form, the set of orbital parameters comprises the Keplerian orbital parameters ($\alpha$, e, i, $\Omega$, $\omega$, M), and the historical ephemeris data comprises a set of values of the orbital parameters ($\alpha[t]$, e[t], i[t], $\Omega[t]$, $\omega[t]$, M[t]) over a time period $t=(t_1, t_2 \ldots, t_n)$, and estimating a dynamical orbital model comprises fitting a model to the historical ephemeris data for orbital parameters ($\Omega$, $\omega$, M) and a mean motion of the satellite over the time period t, and using the value of the orbital parameter for the most recent time point ($t_n$) in time period t for each orbital parameter ($\alpha$, e, i). In another form estimating a dynamical orbital model comprises fitting a model to the historical ephemeris data for orbital parameters ($\alpha$, e, i, $\Omega$, $\omega$, M), and a mean motion $\rho$ of the satellite over the time period t where $t_n$ is a time of the most recent time point in time period t. In a further form, fitting a model comprises fitting a linear least squares model for orbital parameters ($\alpha$, i, $\Omega$, $\omega$, M), and fitting a non-linear least squares model for (e). In one form the time point $t_n$ is the time of the most recent orbital parameter data and the time period comprises at least the two weeks preceding and including $t_n$.

In one form the epoch time is a time of the ascending node transit for the satellite occurring immediately before a predefined time period of interest. In a further form the method further comprises:

performing a linear fit $\rho = m_\rho t + c_\rho$ for a mean motion $\rho$ over a time period $t=(t_1, t_2 \ldots, t_n)$ to obtain a slope parameter $m_\rho$ and an offset $c_\rho$, and determining the time duration T for the satellite to complete the next K complete orbits since a time of the most recent orbital parameter data $t_n$ using $$T = \frac{\sqrt{c_\rho^2 + 2m_\rho K} - c_\rho}{m_\rho}$$

or $T=K/\rho$ for $m_\rho=0$; or performing a linear fit for historical orbit number as a function of time to obtain an estimate of the number of complete orbits K and estimating the mean motion $\rho$ from the derivative of the orbit number with respect to time, and determining the time duration T for the satellite to complete the next K complete orbits since a time of the most recent orbital parameter data $t_n$ using the estimated mean motion $\rho$.

Once the time duration T is obtained the epoch time is determined using $T_{epoch}=t_n+T$.

In one form, fitting a model comprises using a robust fitting method. In a further form, the robust fitting method for fitting a linear model comprises using the Theil-Sen robust linear fitting method. In one form generating a set of synthetic orbital elements at an epoch time using the dynamical orbital model comprises calculating extrapolated orbital elements using the epoch time. In one form, the predefined terminal position is a position stored in a memory of the terminal apparatus. In one form the terminal further comprises a satellite positioning system receiver, and the predefined terminal position is obtained from the satellite positioning system receiver.

According to a second aspect, there is provided a terminal apparatus for use in a satellite communication system wherein the satellite is a minimally controlled satellite, the apparatus comprising:

at least one antenna;
a communications module configured to at least transmit data to the satellite using the at least one antenna;
at least one processor and a memory, wherein the memory comprises instructions for causing the processor to perform the terminal apparatus steps of the first aspect.

In one form, the terminal apparatus receives historical ephemeris data via the communications module and is configured to estimate the dynamical orbital model. In one form, the terminal apparatus further comprises a satellite positioning system receiver configured to provide a position estimate of the terminal apparatus to the orbital predictor. In one form, the memory is configured to store an estimate of the position of the terminal apparatus and comprises instructions for providing the position to the orbital predictor module. In one form the terminal apparatus further comprises an alarm module which receives an estimate of a satellite pass time period, and is configured to wake up the terminal apparatus during the estimated satellite pass time period.

According to a third aspect, there is provided a system comprising a computer apparatus and a terminal apparatus in terminal apparatus in a satellite communication system configured to implement the method of first aspect, wherein the computing apparatus is configured to estimate the dynamical orbital model and to provide the dynamical orbital model to the at least one terminal apparatus which performs at least the three last steps of the method of the first aspect.

BRIEF DESCRIPTION OF DRAWINGS

Embodiments of the present disclosure will be discussed with reference to the accompanying drawings wherein.

In the following description, like reference characters designate like or corresponding parts throughout the figures.

DETAILED DESCRIPTION

Embodiments of a method for generating extended satellite ephemeris data for a satellite for use by a terminal apparatus will now be described. The new method that can be used to accurately predict satellite pass times for much longer time frames than currently possible using current TLEs and orbital predictors such as SGP4. Embodiments of the method are particularly applicable to satellites in uncontrolled orbits or minimally controlled orbits. Broadly historical orbital parameter data (e.g. from historical TLEs) are used to build a predictor for future values of the orbital parameters. The orbital parameter prediction model is then stored on the terminal apparatus (or an existing model can be updated), and at a desired epoch the pre-stored orbital parameter predictor is used to produce estimates of the orbital parameters for the satellite for that epoch (ie synthetic or predicted TLEs). The predicted orbital parameters are then used as input to an orbit predictor to produce an estimate of the satellite's location, for example to determine satellite pass times, or when the satellite will be in a certain position relative to the terminal.

Figure 3:
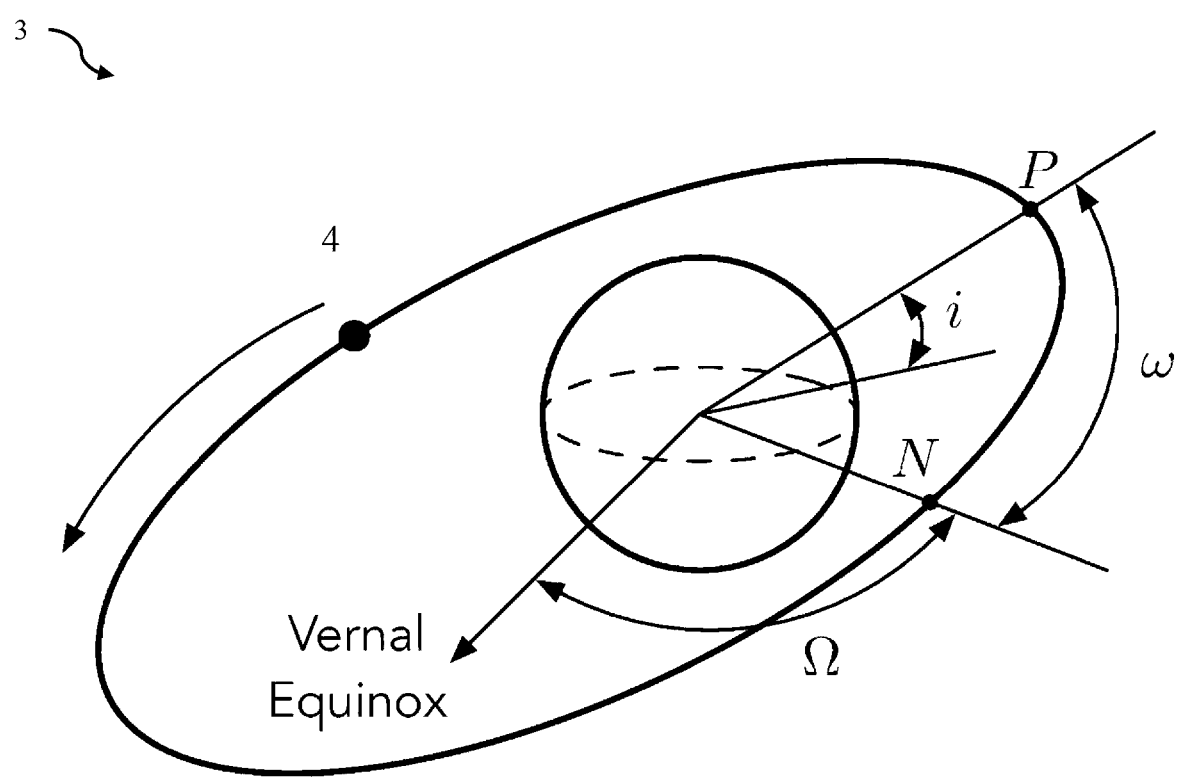
FIG. 3 is a schematic plot of an elliptical orbit and the six Keplerian orbital elements that define the elliptical orbit.

An elliptical orbit 3 can be described by the six Keplerian orbital elements listed in Table 1, and illustrated in FIG. 3. This table also introduces the notation and units that will be used. Choice of units is arbitrary, for example angular quantities could have instead been expressed in radians and distances in meters.

TABLE 1

Keplerian orbital elements.

| Parameter | Symbol | Unit |
| --- | --- | --- |
| Mean anomaly | M | degrees |
| Argument of perigee | ω | degrees |
| Eccentricity | e | — |
| Right ascension ascending node | Ω | degrees |
| Inclination | i | degrees |
| Semi-major axis | a | km |

The Keplerian model is idealized and does not take into account a number of additional effects for objects in Earth orbit, for example atmospheric drag, and gravitational attraction to the sun and moon. However in this embodiment it will suffice to use the ideal Keplerian model. In other embodiments models taking into account these additional effects could be used.

The quantities $\omega$, e, $\Omega$, i, $\alpha$ describe the geometry of the orbital ellipse and its orientation with respect to the Earth, while M describes the position of the satellite in the orbit (i.e. a point on the ellipse). Eccentricity e and semi-major axis $\alpha$ are usual quantities in relation to an ellipse. Furthermore, $\alpha$ is the mean distance of the satellite from the primary body. The inclination i is the angular tilt of the orbital plane with respect to the axis of Earth rotation. An equatorial orbit has i=0 degrees and a polar orbit i=90 degrees. The ascending node is the point in the orbit at which the orbiting body crosses the equatorial plane from South to North. The right ascension ascending node f is the angular distance (longitude) of the ascending node measured from the vernal equinox. The argument of perigee $\omega$ is the angular distance measured around the orbit from the ascending node to the point in the orbit closest to Earth.

Let T be the orbital period, and let n=360/T be the mean angular motion in degrees per time unit. Suppose the satellite was at perigee at time $t_0$, and the time is now $t_0+\Delta t$. Then the mean anomaly is:

$$M = n \cdot \Delta t. \quad \text{Equation (1)}$$

This is the angle measured from perigee that an imaginary satellite in a circular orbit with period T would travel in the same amount of time. Alternatively, the eccentric anomaly E can be used, and these two quantitied are related via $$M = E - e \sin E \quad \text{Equation (2)}$$

and for circular orbits, e=0 and M=E.

Figure 4:
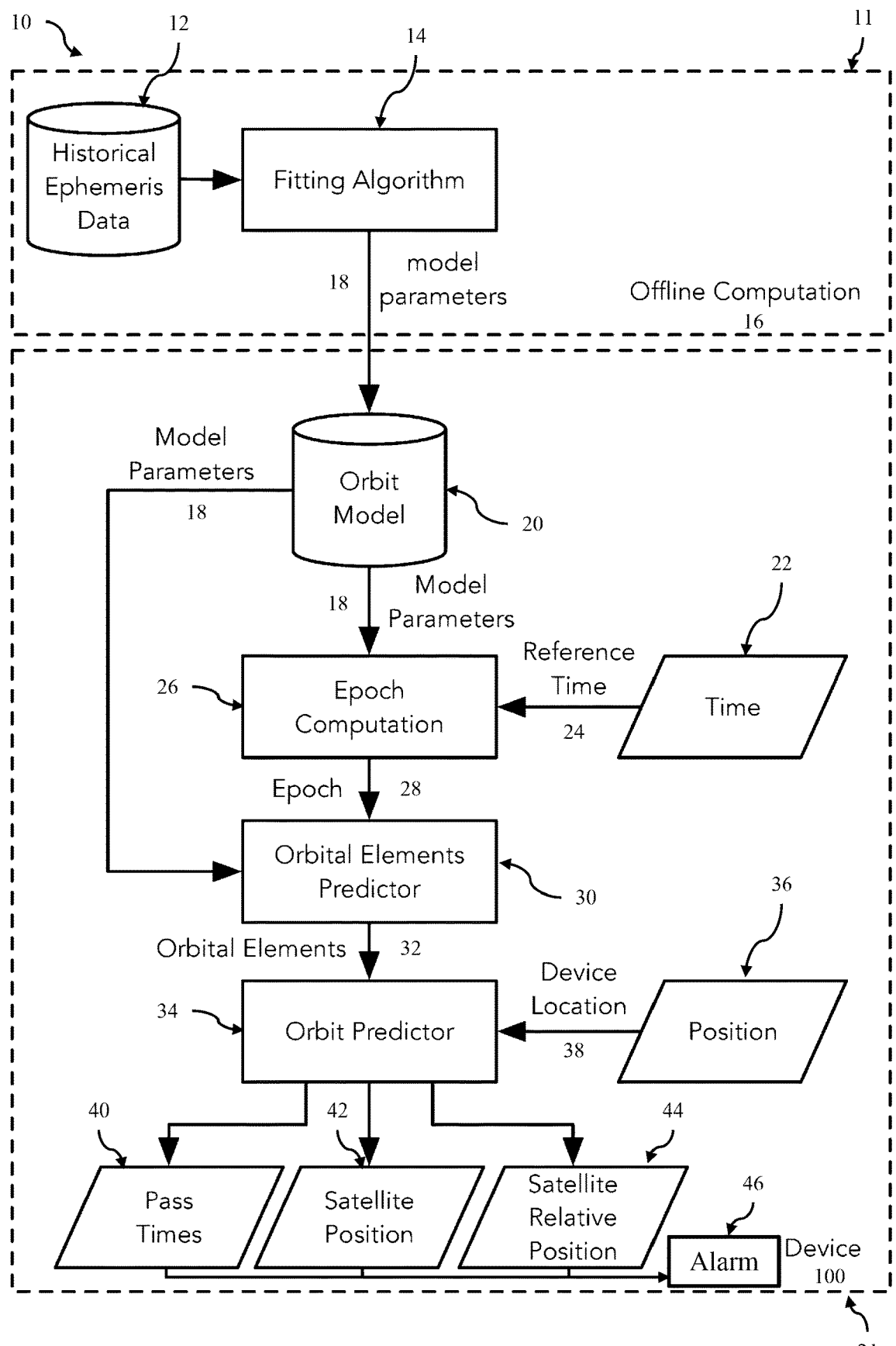
FIG. 4 is a flowchart of method for generating extended satellite ephemeris data for a satellite for use by a terminal apparatus according to an embodiment.

FIG. 4 is a flowchart 10 of a method for generating extended satellite ephemeris data for a satellite 4 for use by a terminal apparatus 100. This method is particularly suitable for use in satellite communication systems in which the satellite 4 is a minimally controlled. As defined above this is a satellite is only infrequently corrected by small amounts (ie small $\Delta v$) for example once every 6 months, every year, every few years, only in emergency circumstances, or never. Many low earth orbit satellites satisfy this criteria including many micro-sats, nano-sats and cube-sats. With reference to FIG. 4, there are two main computational blocks 11, 21 defined by where the computation is performed. The first main component 11 is a software module for estimating a dynamical orbital model 20 of the temporal evolution of the orbital parameters (eg the Keplerian orbital parameters) for the satellite 4. As will be explained below, the estimation or fitting process 14 fits a model to historical ephemeris data 12 and to obtain a set of model parameters 18 which collectively define the dynamical orbital model 20.

This estimation of the dynamical orbital model 11 may be performed as an offline or remote computation 16 performed on a different computing apparatus (or system) to the terminal apparatus 100. For example this may be a standalone computer, smartphone, cloud server, etc that has access to the historical ephemeris data 12. In some embodiments this computing apparatus is located in a central hub of a satellite communications system, or on a cloud based server acting as the central hub of a satellite communication system. This could be performed continuously, periodically such as each month, or more infrequently such as every six or 12 months, or on demand. Once generated this is periodically provided to a terminal apparatus 100. This may be provided over a wired or wireless link when a data connection is available or as part of a remote update procedure, or it may be manually uploaded for example during servicing (eg by a physical data connection such as USB).

Alternatively, if the historical ephemeris data 12 is supplied to, or obtained by, the terminal apparatus, the terminal apparatus could perform this estimation process on board the device from time to time and use this to update a stored dynamical orbital model. For example the terminal apparatus may occasionally be remotely updated, serviced (eg a yearly service) or occasionally have access to a data connection such that it can obtain the historical ephemeris data.

If the dynamical orbital model was generated from a source external to the terminal apparatus it is sent to or provided to the terminal apparatus. Once the dynamical orbital model is available to the terminal apparatus it is stored by the terminal apparatus, or an earlier stored dynamical model is updated (or replaced) based on the newly calculated model parameters.

The second main computational block 21 is performed on-board the terminal apparatus 100 after the dynamical orbital model is generated 11 and stored in the memory of the terminal apparatus. In this block the terminal apparatus uses the stored dynamical orbital model (or more specifically the set of model parameters 18) to obtain predictions of the satellite pass times 40, and/or the satellite position 42, and/or the satellite position relative to the device 44. This process can be performed for each of a set (or constellation) of satellites. In one embodiment the terminal apparatus comprises an alarm module 46 which use this information to determine pass times 40 for the one or more satellites of interest in order to wake the terminal apparatus from a low power sleep mode and transmit data to, or receive data from one of the satellites when the satellite is estimated to be in view of the terminal apparatus.

The method broadly comprises generating a set of synthetic orbital elements 32 at an epoch time 28 using the dynamical orbital model 20. This involves obtaining a reference time 24 from a time source 22 such as an internal clock, external clock or timing source synchronized to UTC. An Epoch computation 26 is performed to determine a suitable Epoch time for which it is desired to generate a set of synthetic orbital elements 32. Typically this is a short amount of time prior to the desired time for which the satellite location will be predicted. In one embodiment the Epoch time depends on, or is selected based on the orbital model, such as the most recent time of ascending node with respect to the reference time. Once the Epoch time computation 26 is performed, and an Epoch time 28 is obtained, an orbital element predictor module 30 uses the set of model parameters 18 for the dynamic orbital model 20 to generate a set of orbital elements 32 for that Epoch. These will be referred to as synthetic orbital elements to indicate they are locally generated estimates (rather than those transmitted by a satellite or reference source). The synthetic orbital elements 32 comprise a predefined set of orbital elements such as a set of Keplerian parameters, or a TLE for use by an orbital predictor 34. The synthetic orbital elements 32 are then provided to an orbit predictor 32 such as SGP4, J2 or some other alternative. The orbit predictor 24 is used to predict the absolute location of the satellite 42, and/or the satellite position relative to the terminal apparatus 44 if the terminal position 38 is known, and/or one or more pass times 40 if the position of the terminal is known. The location of the terminal apparatus 38 device is obtained from a position source 36, which in the case of a stationary device may be a memory which stores the known position of the terminal apparatus, or the position 38 may be obtained from a positioning service 36, such as GPS. Embodiments of this method are discussed in more detail below.

As outlined above, estimation of the dynamical orbital model 20 is based on modelling the time evolution of the orbital parameters 18 which define an orbital model to allow the parameters to be used to predict improved (or long lasting) orbital element for use by an orbital predictors. In the following embodiment the orbital model will be expressed in terms of Keplerian parameters, however this choice is arbitrary and is only adopted for convenience. This orbital model is suitable for uncontrolled satellites such as uncontrolled sun synchronous satellites, typically found in low earth orbits, as well as minimally controlled satellites, again typically found in low earth orbits. The set of orbital parameters used by the model is any set of parameters sufficient to model the motion of a minimally controlled satellite in orbit. In other embodiments more sophisticated orbital models and other choices of parameters to model coordinate systems can be used. Similarly, the methods described have applications to other kinds of orbits, and application to these orbits is straightforward development of the methodology described herein.

Figure 1:
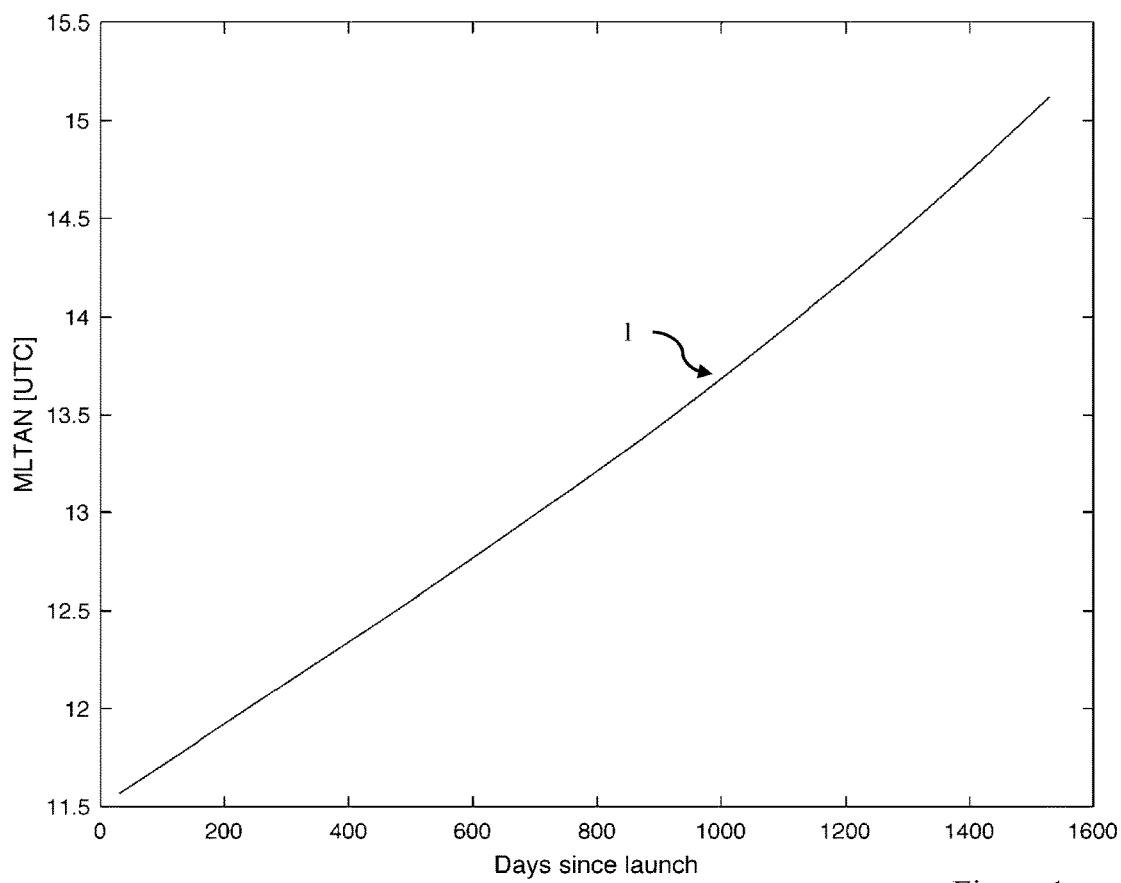
FIG. 1 is a plot of a curve of the mean local time of ascending node (MLTAN) for a small satellite nominally in sun synchronous orbit.
Figure 2:
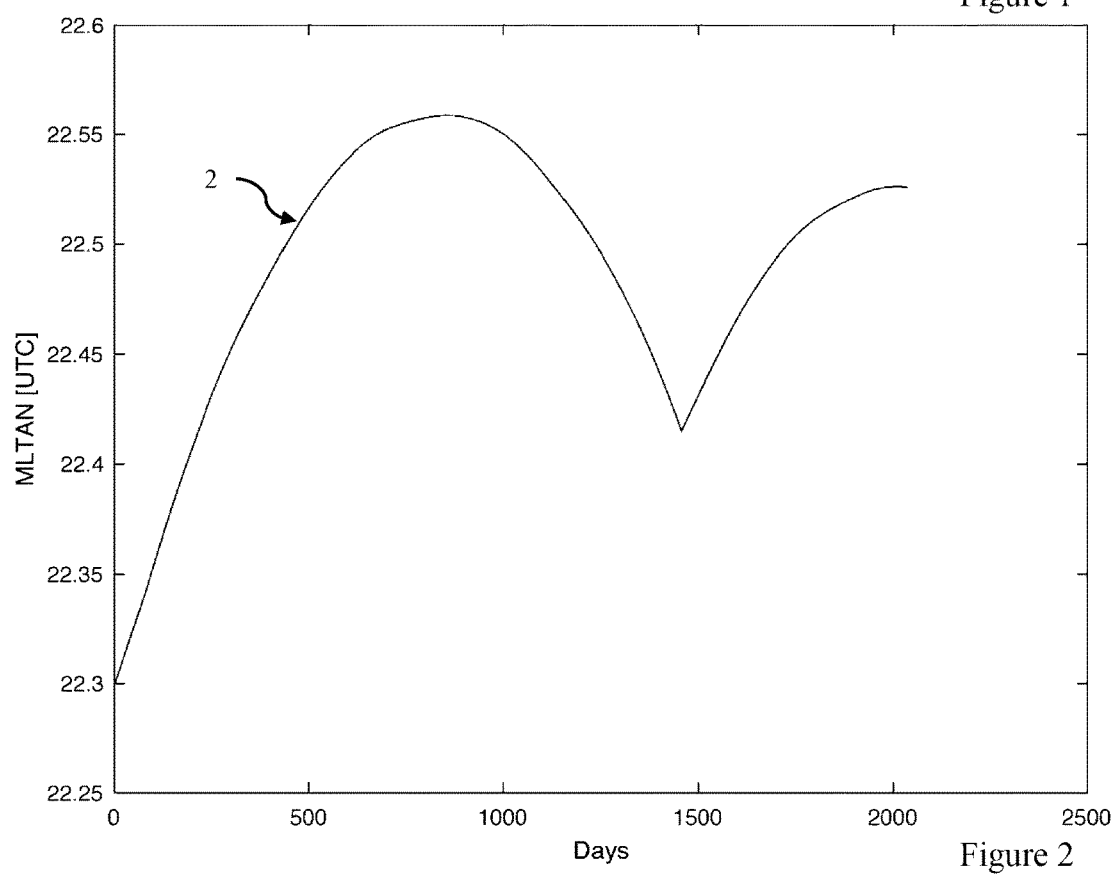
FIG. 2 is a plot of a curve of the mean local time of ascending node (MLTAN) for a satellite in a controlled sun synchronous orbit.
Figures 5A, 5B, 5C, 5D, 5E, 5F:
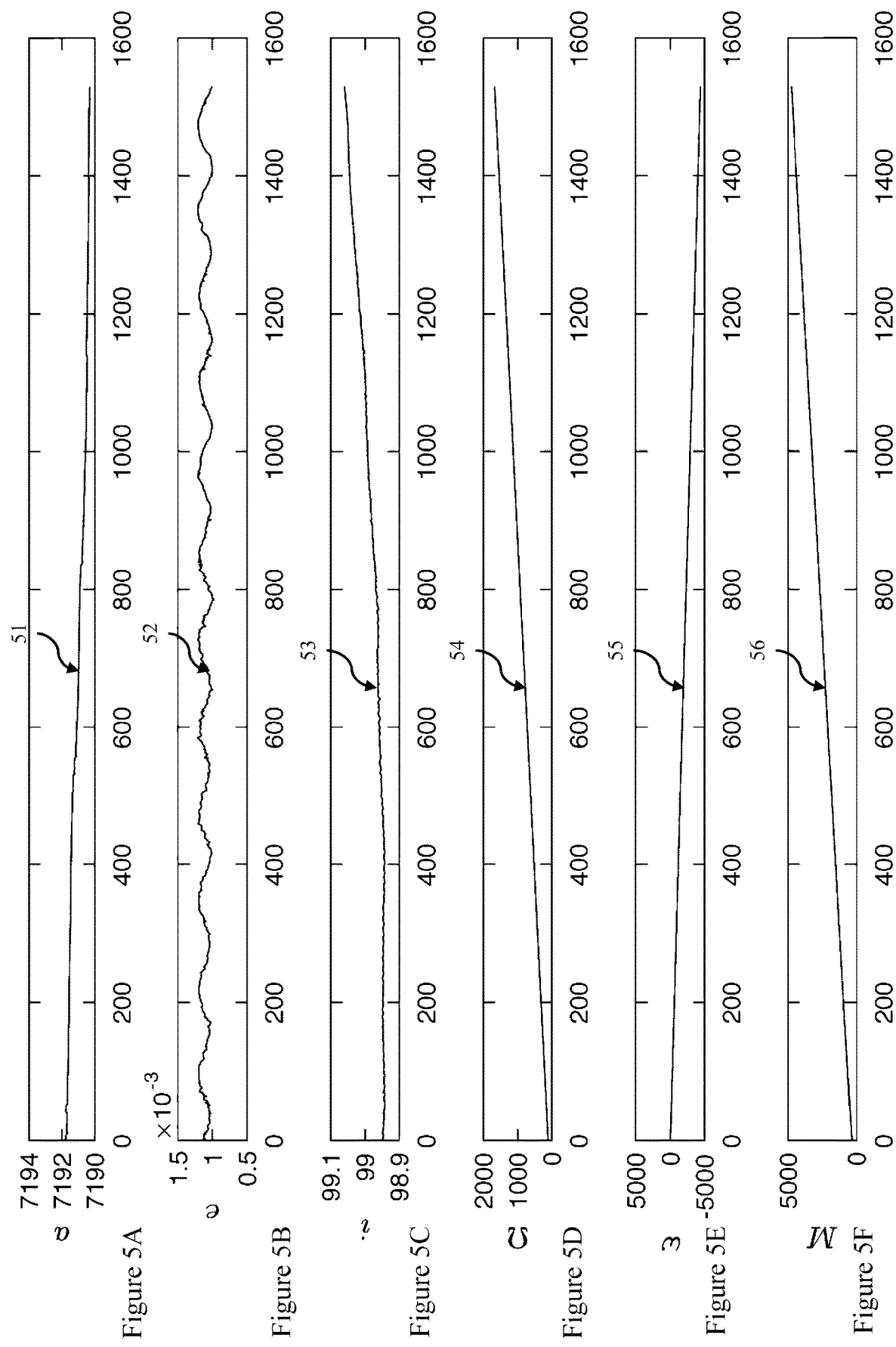
FIG. 5A is a plot of the historical values of the semi-major axis α of a satellite orbit according to an embodiment.
FIG. 5B is a plot of the historical values of the eccentricity e of a satellite orbit according to an embodiment.
FIG. 5C is a plot of the historical values of the inclination i of a satellite orbit according to an embodiment.
FIG. 5D is a plot of the historical values of the right ascension ascending node Ω of a satellite orbit according to an embodiment.
FIG. 5E is a plot of the historical values of the argument of perigee ω of a satellite orbit according to an embodiment.
FIG. 5F is a plot of the historical values of the mean anomaly M of a satellite orbit according to an embodiment.

Using historical orbital parameter data 12 over a time period T we can develop or fit a model consistent with how those orbital parameters evolved over time, and use it to predict future values of these orbital parameters 18. FIGS. 5A to 5F shows historical values of the Keplerian elements for the same low earth orbit satellite from the earlier example of FIG. 1. The horizontal axis is days since launch. The angles for $\Omega$, $\omega$ and M are "unwrapped". FIG. 5A shows a curve 51 of the historical values of the semi-major axis $\alpha$, FIG. 5B shows a curve 52 of the historical values of the eccentricity e, FIG. 5C shows a curve 53 of the historical values of the inclination i, FIG. 5D shows a curve 54 of the historical values of the right ascension ascending node $\Omega$, FIG. 5E shows a curve 55 of the historical values of the argument of perigee $\omega$, and FIG. 5F shows a curve 56 of the historical values of the mean anomaly M.

From these Figures, we see that M evolves linearly over time (and this is to be expected from equation (1)). Interestingly, both $\omega$ and $\Omega$ also appear to evolve linearly over time. While $\alpha$, i and e are not so linear, they also do not vary much. Thus in one embodiment a model for the orbit parameters is generated as follows. We assume that the most recent series of values of $\alpha$, e, i, $\Omega$, $\omega$, M are available for some time period (or interval of time) T. Let t be the time variable and suppose we have data for time instances t=($t_1$, $t_2$ ..., $t_n$) over the time period t. Time instance $t_1$ is the oldest time point in time period t and $t_n$ is the most recent time point during time period t. The time instances may be a time of issuance of the orbital parameters or an epoch time of a certain event such as a particular orbital position (eg start of orbit or a reference point in the orbit). The most recent time point $t_n$ in the time period of interest t may be the time of the most recent orbital parameter data (ie no further orbital parameter data has been issued) or it may be somewhat older, although preferably within the last month or since the most recent orbital correction. The time period may be over the previous two weeks (prior to and including $t_n$), the previous month, or the time period from the most recent issuance of orbital parameter data back ($t_n$) to the most recent orbital correction. In some embodiments the time period may be defined by the last n data points (ie just use the last 10, 20 or 30 values could be used). Note that these time instances may or may not be regularly spaced (and for TLE data they typically are not) over the time period. Further the time instances need not be every time instance that data was issued between the first and last time instance (ie the time period need comprise contiguous time points). For example every second data point could be used, or only a single data point per day may be used over some time period, etc. Let $\alpha$[t], e[t], i[t], $\Omega$[t], $\omega$[t], M[t] each be the values of the orbital parameters at a given time t.

We then fit a model for each time series dataset, for example by using linear or non-linear regression or fitting techniques, or using an alternative estimation technique such as a Kalman filter (and associated Kalman predictor) or Bayesian estimators. In the context of this specification fitting a model will encompass both regression techniques and related estimation techniques.

The fitting methodology should be selected to suit the particular parameter of interest. For example, linear least squares can be used to obtain fitting parameters for data that evolves approximately linearly. Alternatively, higher order polynomial fits or non-linear periodic functions may be appropriate, e.g. quadratic or sinusoidal. Fitting polynomials such as linear or quadratic functions to noisy data is a standard problem and has well-known solutions which can be applied. For some data, it may be advantageous to use non-linear fitting, such as non-linear least squares. Again, there are many choices of such algorithms already available. In some cases choice of the appropriate fitting function may be an iterative process. For example if a linear fit indicates structure or curvature in the residuals, this may indicate a non-linear quadratic or polynomial fit is more appropriate, and the data may then be refitted using such an approach. Alternatively fitting may be performed using a high order polynomial (for example a cubic), and then insignificant terms eliminated, and the data may be refitted. Fitting methodology may directly fit or indirectly fit each orbital parameter. For example the model fitting may fit a model based on the Keplerian parameters such as by utilizing a change of variable, a function of a variable, and/or utilize a transformation of coordinates. For example in one embodiment rather than directly fit the mean anomaly M, the true anomaly of the satellite is used/fitted instead of mean anomaly and the mean anomaly is derived from true anomaly. Similarly the eccentric anomaly of the satellite is used/fitted instead of mean anomaly, and the mean anomaly is derived from the eccentric anomaly via Kepler's equation. In another embodiment the orbit number of the satellite is used/fitted instead of mean motion, and mean motion is derived as the derivative of orbit number with respect to time.

Additionally robust fitting (or robust regression) methods may be used to down-weight the effect of outliers. Some of the historical data obtained may be (a) noisy/unreliable, or (b) include outliers for example due to a small maneuver. In such cases, it may be beneficial to use robust fitting (or regression) algorithms that discount or down-weight outliers, for example robust techniques like iteratively reweighted least squares, least trimmed squares, or the Theil-Sen method. The Theil-Sen method fits a line through sample points by choosing the median of the slopes of all lines through all pairs of sample points (strictly the median of the slopes defined only from pairs of points having distinct x-coordinates). The use of robust fitting methods can also be used to offset the amount of data (eg n may be smaller if a robust fitting method is used). In some cases, joint fitting of the some or all of parameters may be performed, for example using general linear modelling approaches such as multiple linear regression (including using robust fitting methods).

Based on the observations in FIG. 5, Table 2 outlines a fitting methodology according to an embodiment:

TABLE 2

Fitting methodology for historical ephemeris data.

| Parameter | Symbol | Fitting method | Fitting parameters and function | Alternative if variation in parameter is small |
|---|---|---|---|---|
| Mean anomaly | M | Linear least squares | $(m_M, c_M)$ $m_M t + c_M$ that best fits $M[t_0]$, $M[t_1]$, $M[t_n]$ | |
| Argument of perigee | $\omega$ | Linear least squares | $(m_\omega, c_\omega)$ $m_\omega t + c_\omega$ that best fits $\omega[t_0]$, $\omega[t_1]$, $\omega[t_n]$ | |
| Eccentricity | e | Non-linear least squares | (frequency v, phase $\theta$) sinusoid $c_e \sin(v_e t + \theta_e)$ that best fits $e[t_0]$, $e[t_1]$, $e[t_n]$. | $v_e = \theta_e = 0$, and $c_e = e[t_n]$. |
| Right ascension ascending node | $\Omega$ | Linear least squares | $(m_\Omega, c_\Omega)$ $m_\Omega t + c_\Omega$ that best fits $\Omega[t_0]$, $\Omega[t_1]$, $\Omega[t_n]$. | |
| Inclination | i | Linear least squares | $(m_i, c_i)$ $m_i t + c_i$ that best fits $i[t_0]$, $i[t_1]$, $i[t_n]$ | $m_i = 0$, $c_i = i[t_n]$ |
| Semi-major axis | a | Linear least squares | $(m_a, c_a)$ $m_a t + c_a$ that best fits $a[t_0]$, $a[t_1]$, $a[t_n]$. | $m_a = 0$ and $c_a = a[t_n]$. |

FIG. 5 indicates that the variation in parameters (e, i, α) is small. Thus in one embodiment regression fitting is only performed on parameters (Ω, ω, M) and parameters (e, i, α) are set to the most recent historical values (ie at $t_n$). This may be predetermined, for example based on a past analysis of the historical data indicating these values were slowly changing, or it may be done dynamically as part of the analysis of the historical data. For example threshold values for the fitted parameters may be predefined, and if the fitted values are less than these predefined variables the parameter is set to the most recent historical value (ie at $t_n$).

In addition to obtaining dynamical estimates of the Keplerian orbital parameters, the Epoch computation described below requires a model for the mean motion of the satellite. This may be again be obtained by fitting (or regression), for example using a linear least squares fit to historical data in a similar way that we described above for the other parameters. If ρ is the mean motion, then in one embodiment a linear least squares fit finds $m_\rho$, $c_\rho$ that describes the best-fit line $m_\rho t + c_\rho$. In one embodiment the orbit number of the satellite is fitted instead of mean motion, and mean motion is derived as the derivative of orbit number with respect to time.

The dynamical orbital model 20 consists of the model parameters 18 determined during the fitting step 14 (including the mean motion). The dynamical orbital model may also include errors (if also estimate) in the fitted parameters. In some embodiments the set of orbital parameters fitted by the dynamical orbit model is any set of parameters sufficient to model the motion of a minimally controlled satellite in orbit. For example some orbital parameters may not vary significantly and so may be set to a fixed value and not fitted by the model.

Once the dynamical orbital model is obtained and stored by the terminal apparatus 100 the terminal apparatus 100 can use this to obtain. The method comprises three main processing steps: epoch computation 26, prediction/generation of orbital parameters at the epoch 30 and then provision of these "synthetic" orbital elements (ie a synthetic TLE) as input to a standard orbital predictor 34 which predicts the satellite location at times around the Epoch. Note that we are using TLE as a generic descriptor of orbital elements and as such it is to apply to any set of orbital parameters and not necessarily just the NORAD two-line elements.

The terminal apparatus has access to time source 22 that provides a time-of-day reference time 24 that is sufficiently accurately synchronized to UTC. For example, the terminal apparatus may obtain time from a GPS module, a stable local oscillator which is periodically resynchronized to UTC, or some other timing reference source both internal and external to the terminal apparatus 100.

Most orbital predictors (SGP4 etc) take as input a set of orbital parameters (ie the ephemeris data) which describe the orbit and satellite position at a particular time instance, known as the Epoch. In many cases it is convenient for the epoch to be aligned to a particular event on the orbit such as the time of ascending node. Typically, but not always, we want to set the Epoch to be in the vicinity of the Reference Time. Thus in one embodiment, the Epoch time 28 is computed to be the time of the ascending node transit occurring immediately before the time period of interest for the satellite pass prediction.

Figure 6:
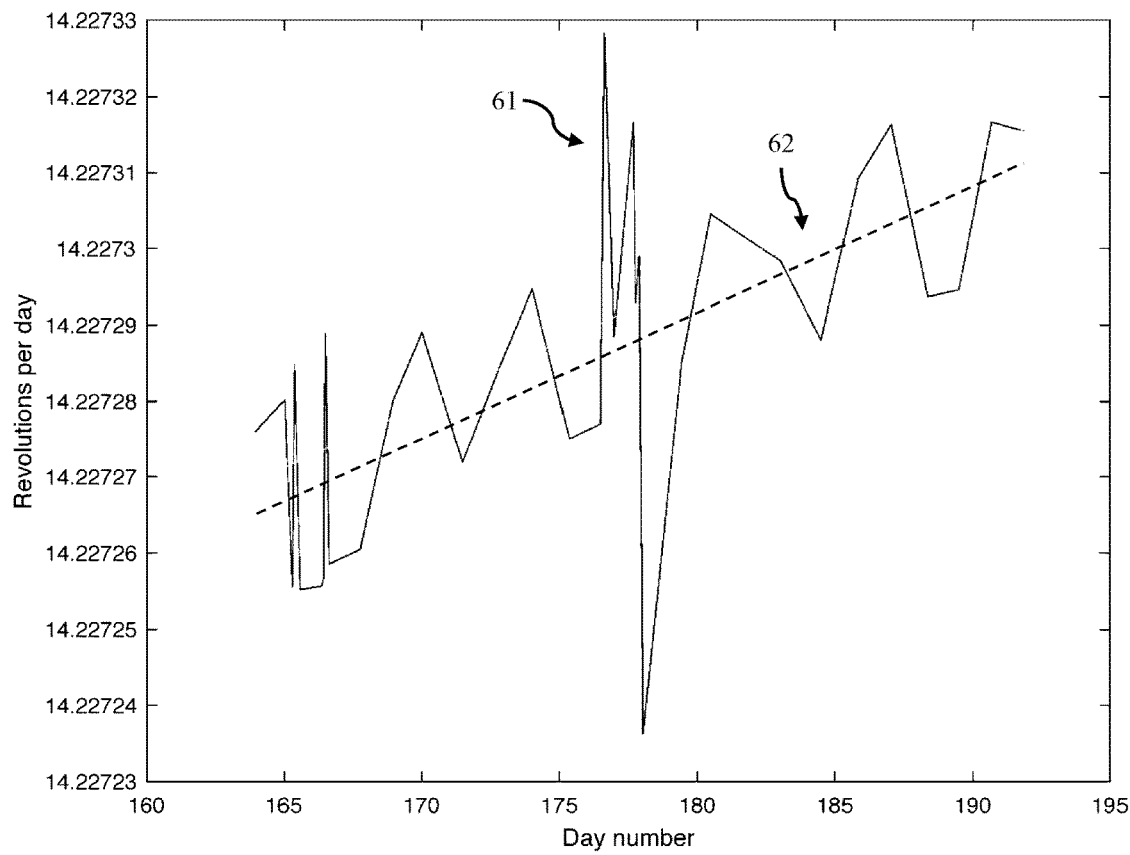
FIG. 6 is a plot of the mean motion of the satellite according to an embodiment.

Let $t_n$ be the Epoch time of the most recent historical set of orbital parameters, and let $m_\rho$ and $c_\rho$ be the slope and offset parameters of the best (robust) linear fit to the historical mean motion data ρ. FIG. 6 shows a plot of the mean motion of the same satellite as shown in FIGS. 5A to 5F. The solid line 61 shows the historical data (30 days worth of actual TLE data) and dashed line 62 is a Theil-Sen robust linear fit with fitted parameters $c_\rho = 14.22699787$ revolutions/day and $m_\rho = 1.65664 \times 10^{-6}$ revolutions per day squared.

Let ρ be expressed in units of revolutions/time (time in the same units as t). Suppose we want to estimate the time duration T for the satellite to complete the next K complete orbits. Then it can be shown that:

$$K = \int_0^T (m_\rho t + c_\rho) dt \qquad \text{Equation (3)}$$

Similar equations are obtainable for other fitting models. Performing this integral and solving for T yields:

$$T = \frac{\sqrt{c_\rho^2 + 2 m_\rho K} - c_\rho}{m_\rho} \qquad \text{Equation (4)}$$

and we take the non-negative solution. Note that for $m_\rho = 0$, we can use l'Hôpital's rule to recover $T = K/\rho$.

Using Equation (4) it is straightforward to determine a suitable T, which is an offset to $t_n$ that corresponds to an given integer number of orbital revolutions K. Thus in one embodiment a linear fit for $\rho = m_\rho t + c_\rho$ for a mean motion ρ over a time period $t = (t_1, t_2, \ldots, t_n)$ to obtain a slope parameter $m_\rho$ and an offset $c_\rho$ is performed, and these are provided to equation (4) to determine T. Alternatively the number of complete orbits K can be estimated by performing a linear fit for historical orbit number as a function of time and using this fit to directly estimate K. An estimate of the mean motion ρ is then obtained as the derivative of the orbit number with respect to time, and this is then used to determine the time duration T, for example using equation (4). Conversely, for a given target time offset T', we can easily use Equation (4) to find the nearest T (before or after T' as desired) corresponding to some integer number of orbit revolutions.

Figure 7:
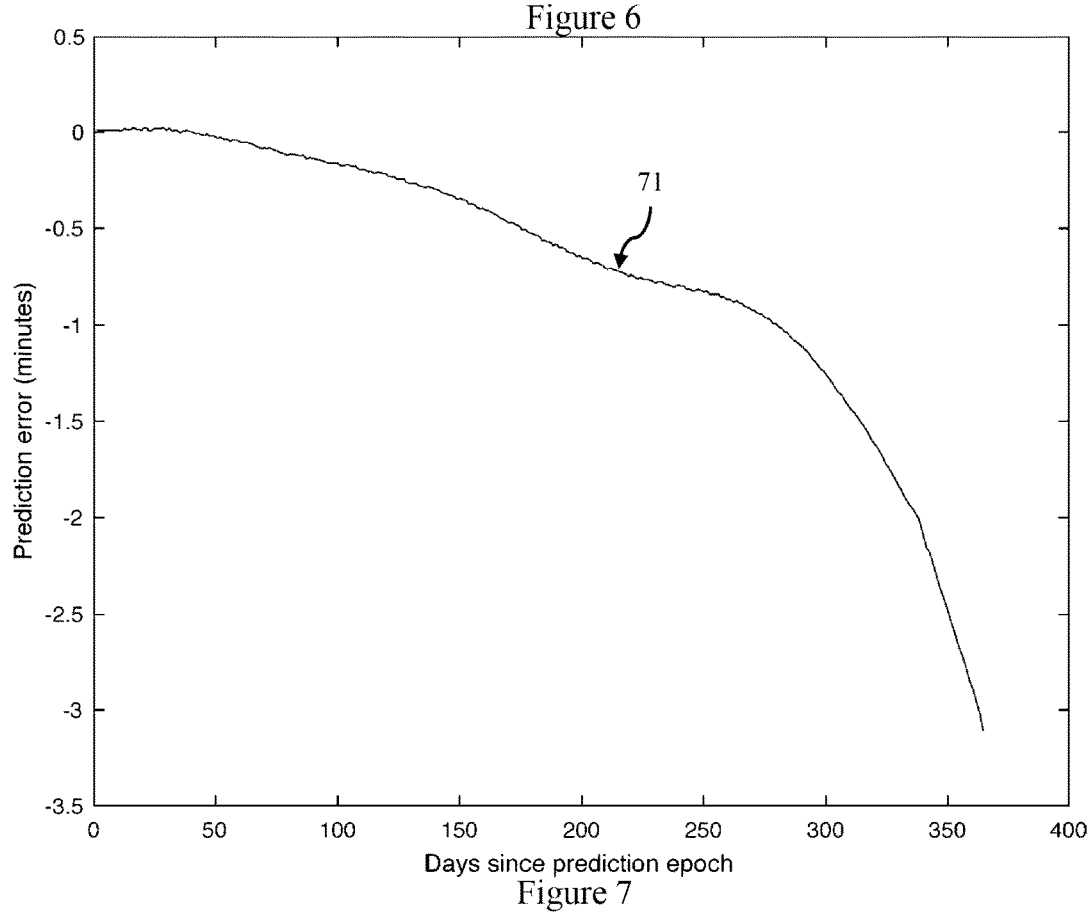
FIG. 7 is a plot comparing the epoch prediction with the actual epoch according to an embodiment.

We can now set the Epoch to be $T_{epoch}=t_n+T$. For example after obtaining slope parameter $m_p$ and an offset $c_p$, the time duration T for the satellite to complete the next K complete orbits could be estimated by using equation (4) for a range of values of K until T is just before the start of the timer period of interest T'. That is we can search for K such that $T_K \leq T' < T_{K+1}$ and in doing so obtain T $(=T_K)$. This could be performed by starting with an initial value (eg 1 or 1000) and then incrementing or decrementing K depending upon whether the time is before or after the start of the time period of interest. Alternatively equation (3) could be used by using T=T' in equation (3) and then rounding down the value of K to the nearest integer (to get the number of complete orbits) and then finding T using equation (4). FIG. 7 shows the result of this process for our example satellite. Epoch times were computed using the fit obtained in FIG. 6 from historical ephemeris data. The solid line 71 shows the error between the predicted Epoch time and the actual TLE epoch time. It can thus be seen that the error is only 1 minute after around 300 days, and at one year into the future, the error is only approximately three minutes. The magnitude of this error will dominate the error of the eventual satellite pass prediction, so this shows very good performance.

The Orbital Elements Predictor 30 is then used produce a predicted set of orbital elements (ie ephemeris data or TLEs) for the time instance $T_{epoch}$. This predictor 30 takes as input the previously computed $T_{epoch}$ 28, as well as the orbital model parameters 34 computed above and uses extrapolation to obtain the desired orbital parameters for the desired reference time. For example in the current embodiment, we would compute:

$$\alpha[T_{epoch}]=m_\alpha T_{epoch}+c_\alpha \quad \text{Equation (5)}$$

$$i[T_{epoch}]=c_e \sin(v_e T_{epoch}+\theta_i) \quad \text{Equation (6)}$$

$$\Omega[T_{epoch}]=m_\Omega T_{epoch}+c_\Omega \quad \text{Equation (7)}$$

$$\omega[T_{epoch}]=m_\omega T_{epoch}+c_\omega \quad \text{Equation (8)}$$

$$M[T_{epoch}]=m_M T_{epoch}+c_M. \quad \text{Equation (9)}$$

Other models (e.g. higher order polynomial) and their corresponding fitted parameters can be used to find similar predictions. For example, a Kalman predictor might be used together with parameters determined by a process of Kalman fitting.

Figures 8A, 8B, 8C, 8D, 8E, 8F:
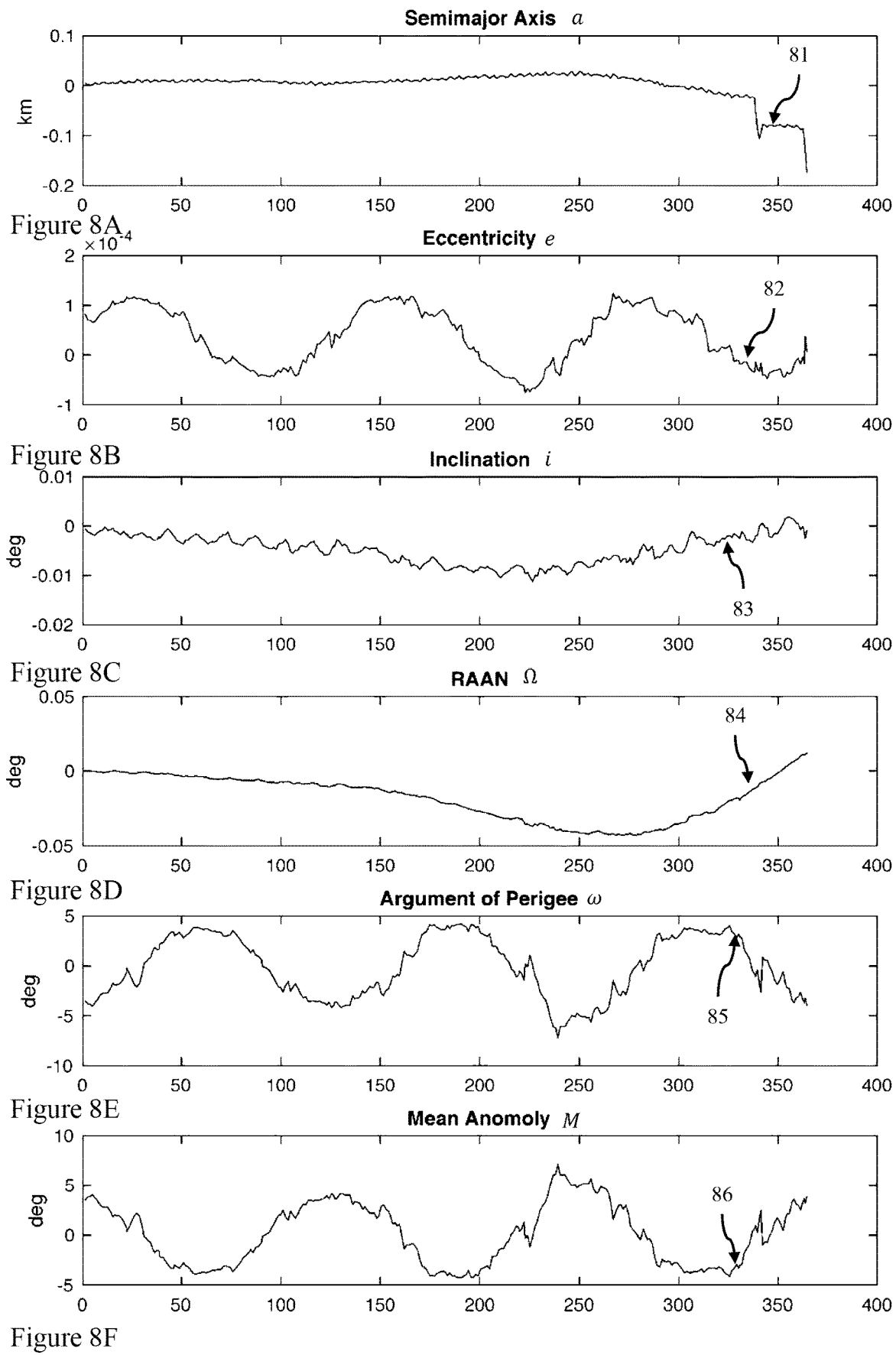
FIG. 8A is a plot of the error of time in the estimated semi-major axis α of a satellite orbit according to an embodiment.
FIG. 8B is a plot of the error of time in the estimated eccentricity e of a satellite orbit according to an embodiment.
FIG. 8C is a plot of the error of time in the estimated inclination i of a satellite orbit according to an embodiment.
FIG. 8D is a plot of the error of time in the estimated right ascension ascending node Ω of a satellite orbit according to an embodiment.
FIG. 8E is a plot of the error of time in the estimated argument of perigee ω of a satellite orbit according to an embodiment.
FIG. 8F is a plot of the error of time in the estimated mean anomaly M of a satellite orbit according to an embodiment.

FIGS. 8A to 8F shows plots of the absolute error over time for the orbital parameters for our example satellite. The horizontal axis is time measured in days since the most recent historical data point. The immediately preceding thirty days' worth of data was used to produce the fit. FIG. 8A shows a curve 81 of the absolute error of the semi-major axis α, FIG. 8B shows a curve 82 of the absolute error of the eccentricity e, FIG. 8C shows a curve 83 of the absolute error of the inclination i, FIG. 8D shows a curve 84 of the absolute error of the right ascension ascending node Ω, FIG. 8E shows a curve 88 of the absolute error of the argument of perigee ω, and FIG. 8F shows a curve 86 of the absolute error of the mean anomaly M.

FIGS. 8A to 8F illustrate that the results obtained using the simple linear fit are adequate, although improved (ie reduced errors) would be obtained by fitting sinusoidal functions to e, i, ω and M, as mentioned earlier. It is also noted that the errors in ω and M tend to cancel out (since M is measured as an offset from ω). These figures also reveal the effect of a small adjustment applied to the spacecraft at around 350 days. This represents a significant extension of time of the validity of ephemeris data compared with the normal few hours to days over which TLE data is typically valid.

Having now obtained updated or synthetic orbital elements, an orbit predictor module 34 such as SGP4 or J2 (Shraddha Gupta, M. Xavier James Raj, and Ram Krishan Sharma. Short-term orbit prediction with J2 and mean orbital elements. International Journal of Astronomy and Astrophysics, 1:135{146, 2011.) uses the synthetic orbital elements 32 produced by the Orbital Elements Predictor 30 to estimate the absolute position 42 of the satellite at a time close to $T_{epoch}$. It can also be used to determine the relative position 44 (e.g. range, elevation angle, azimuth angle) of the satellite 4 from the point of view of the terminal apparatus 100. In this case, the position 38 of the terminal apparatus is also required, and may be provided a position reference source 36 such as GPS, or stored in a memory for a stationary terminal apparatus 100. The orbit predictor 30 can also be used to estimate the time of the next pass (or next passes) as seen by the terminal apparatus 100. This again requiring knowledge of the approximate position 38 of the terminal apparatus 100.

When estimating pass times, it can also be useful to report an estimate for possible error (e.g. pass time plus or minus error time). For example, in an application where a device is using the predicted pass time to wake from sleep to communicate with a satellite, it can wake a little early and stay awake a little longer to allow for the uncertainty in the pass time.

Figure 9:
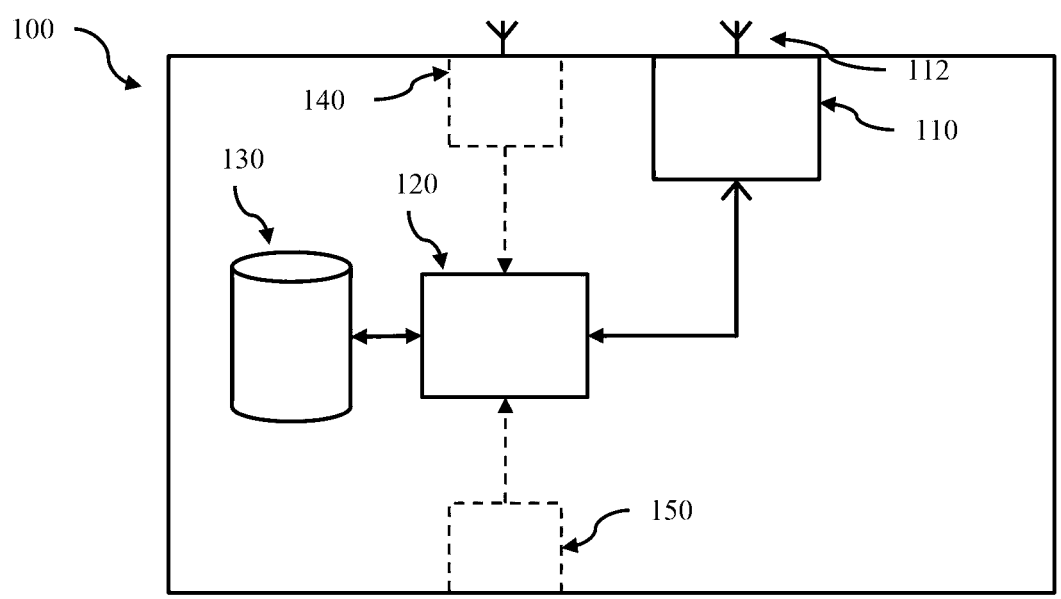
FIG. 9 is a schematic diagram of a terminal apparatus according to an embodiment.

As discussed above, the epoch computation, prediction of orbital elements and actual orbital prediction can be performed on board a terminal apparatus. FIG. 9 is a schematic diagram of a terminal apparatus 100 according to an embodiment. The terminal apparatus comprises a communications module 110, such as RF front comprising one or more antennas 112, and associated hardware for preparing and transmitting data to a satellite 4 over a radio frequency link, including encoding and modulation. In some embodiments the communications module 110 is also configured to receive (and decode) data from the satellite or other sources. The communications module comprises an RF front end and additional hardware and/or software components. Received signals are converted to baseband by a RF front end, and delivered to a baseband receiver for processing, such as demodulation and decoding to extract message data. Similarly a terminal transmitter receives source bits and uses these to generate the baseband signal for transmission via the user terminal RF front end, such as applying a modulation and coding scheme, and selecting transmit subcarriers and power. The communications module may be a stand-alone module or board, or be integrated with other components. A software defined radio implementation may be used where a RF front end provides received signals to an analog to Digital (ADC) converter that provides spectrum samples to a signal processor.

The terminal apparatus also comprises a processor module 120 and memory 130. The memory comprises software instructions or software modules to cause the processor to implement the method described herein such as storing the orbital model 20, compute or estimate an Epoch 28, generate predictions of orbital elements 32 and pass these to an orbital predictor to obtain pass time, or satellite positions. The memory may also be used to store modules for other functions, such as alarm module to wake up the terminal at the desired time (for example during a predicted satellite pass time). Other components such as power supply, clock, sensor platform etc, may also be included in the terminal apparatus.

The memory 130 is also uses to store the dynamical orbital model 20 and model parameters 18. The terminal apparatus may receive historical ephemeris data 12 and perform the fitting process to obtain (and store) an updated dynamical orbital model 20. Alternatively the dynamical orbital model 30 (and associated model parameters 18) may be provided to the terminal apparatus which stores the model in the memory 120. This may involve updating previously stored values or completely replacing a previously stored model (or saving it for the first time).

The historical ephemeris data 12 or orbital model 20 may be provided via the communications module 110. This may be obtained at a schedule time in which case the device may wake up to receive the transmission, or it may be obtain opportunistically when in range of a source transmitting the data (for example if terminal apparatus is mobile). Alternatively a physical interface such as USB interface may be provided allowing this data to be physically transferred (or uploaded) to the device during a servicing or maintenance. The terminal may have a GPS receiver 140 which can be used to provide position and time estimates (ie both blocks 22 and 36 in FIG. 4). Additionally the terminal apparatus may receive timing information via the communications module 110, or the terminal apparatus may include a stable on-board clock which is periodically synchronized with UTC, for example during servicing or maintenance.

The present application describes embodiments of a method and system for generating extended satellite ephemeris data for a satellite for use by a terminal apparatus. These embodiments are particularly suitable for use with minimally controlled satellites (including uncontrolled satellites). The method that can be used to accurately predict satellite pass times or satellite positions for much longer time frames than currently possible using current TLEs and orbital predictors such as SGP4, for example from hours/days to months/a year or more. Broadly historical orbital parameter data (e.g. from historical TLEs) are used to build a predictor for future values of the orbital parameters (ie to build a dynamical orbital model). This can be performed either at the terminal or off line and the results of the model provided to the terminal.

Once a dynamical orbital parameter prediction model is obtained it is stored on board the terminal apparatus. Then at a desired epoch the pre-stored orbital parameter prediction model is used to produce estimates of the orbital parameters for the satellite for that epoch (ie synthetic or predicted TLEs). These predicted orbital parameters are then used as input to an orbit predictor such as SGP4 to produce an estimate of the satellite's location at a desired time, for example to determine satellite pass times, or when the satellite will be in a certain position relative to the terminal. As shown herein accurate estimates of the satellite location can be produced hundreds of days out from the time the model is generated. This enables low power distributed terminal apparatus to operate efficiently, as the terminal can accurately estimate satellite pass times. This ensures the terminal does not waste power unnecessarily, such as by waking up to receive frequent ephemeris data, or wake for a long period to ensure a satellite pass is not missed.

Embodiment of the method described herein can be used in a range of satellite communications systems where it may be of interest to extend the period during which reasonably accurate estimates of satellite pass timing or satellite locations can be found. These include systems with low bandwidth, or intermittent communications links where it may be difficult of impossible to regularly update ephemeris data; systems with no ability to remotely update ephemeris data, e.g. one-way communications devices; systems where the cost of regularly updating ephemeris data is too high, either in terms of data communications cost, battery use or other costs; and systems that may be susceptible to jamming or spoofing of ephemeris data transmitted to devices.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, or a combination thereof.

In some embodiments the processor module 110 comprises one or more Central Processing Units (CPUs) configured to perform some of the steps of the methods. Similarly a computing apparatus may be used to generate the orbital model to be supplied to the terminal apparatus, and the computing apparatus may comprise one or more CPUs. A CPU may comprise an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). The computing or terminal apparatus may comprise a single CPU (core) or multiple CPU's (multiple core), or multiple processors. The computing or terminal apparatus may use a parallel processor, a vector processor, or be a distributed computing device. Memory is operatively coupled to the processor(s) and may comprise RAM and ROM components, and may be provided within or external to the device or processor module. The memory may be used to store an operating system and additional software modules or instructions. The processor(s) may be configured to load and executed the software modules or instructions stored in the memory.

Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the terms "estimating" or "determining" encompasses a wide variety of actions. For example, "estimating" or "determining" may include calculating, computing, processing, deriving, investigating, looking up (e.g., looking up in a table, a database or another data structure), ascertaining and the like. Also, "estimating" or "determining" may include receiving (e.g., receiving information), accessing (e.g., accessing data in a memory) and the like. Also, "determining" may include resolving, selecting, choosing, establishing and the like.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims. As used herein, a phrase referring to "at least one of" a list of items refers to any combination of those items, including single members. As an example, "at least one of: $\alpha$, b, or c" is intended to cover: $\alpha$, b, c, $\alpha$-b, $\alpha$-c, b-c, and $\alpha$-b-c.

The invention claimed is:

1. A method for generating extended satellite ephemeris data for a satellite for use by a terminal apparatus in a satellite communication system, wherein the satellite is a minimally controlled satellite, the method comprising:
receiving historical ephemeris data for a satellite, wherein the satellite is a minimally controlled satellite;
estimating a dynamical orbital model for generating one or more estimates of a temporal evolution of a set of orbital parameters for the satellite using the received historical ephemeris data;
storing the dynamical orbital model by the terminal apparatus or updating a dynamical orbital model stored by the terminal apparatus, wherein the dynamical orbital model is either received from a source external to the terminal apparatus or the dynamical orbital model is estimated by the terminal apparatus;
generating, by the terminal apparatus, a set of synthetic orbital elements at an epoch time using the dynamical orbital model, and
the terminal apparatus providing the set of synthetic orbital elements to an orbital predictor to obtain an estimate of one or more satellite pass times for a predefined terminal position, or one or more satellite locations at a predetermined future time.

2. The method as claimed in claim 1, wherein estimating of the dynamical orbital model is performed by a computing apparatus remote from the terminal apparatus, and the dynamical orbital model is transmitted or uploaded to the terminal apparatus.

3. The method as claimed in claim 1, wherein the set of orbital parameters is any set of parameters sufficient to model the motion of a minimally controlled satellite in orbit, and the dynamical orbital model is configured to directly or indirectly fit each orbital parameter.

4. The method as claimed in claim 3, wherein the set of orbital parameters comprises the Keplerian orbital parameters ($\alpha$, e, i, $\Omega$, $\omega$, M), and the historical ephemeris data comprises a set of values of the orbital parameters ($\alpha[t]$, e [t], i [t], $\Omega[t]$, $\omega[t]$, M [t]) over a time period $t=(t_1, t_2 \ldots t_n)$, and estimating a dynamical orbital model comprises fitting a model to the historical ephemeris data for orbital parameters ($\Omega$, $\omega$, M) and a mean motion of the satellite over the time period t, and using the value of the orbital parameter for the most recent time point ($t_n$) in time period t for each orbital parameter ($\alpha$, e, i).

5. The method as claimed in claim 3, wherein the set of orbital parameters comprises the Keplerian orbital parameters ($\alpha$, e, i, $\Omega$, $\omega$, M), and the historical ephemeris data comprises a set of values of the orbital parameters ($\alpha[t]$, e [t], i [t], $\Omega[t]$, $\omega[t]$, M [t]) over a time period $t=(t_1, t_2 \ldots t_n)$ where the $t_n$ is a time of the most time point in time period t, and estimating a dynamical orbital model comprises fitting a model to the historical ephemeris data for orbital parameters ($\alpha$, e, i, $\Omega$, $\omega$, M), and a mean motion of the satellite over the time period t.

6. The method as claimed in claim 5, where fitting a model comprises fitting a linear least squares model for orbital parameters ($\alpha$, i, $\Omega$, $\omega$, M), and fitting a non linear least squares model for (e).

7. The method as claimed in claim 1, wherein fitting a model comprises using a robust fitting method.

8. The method as claimed in claim 7, wherein the robust fitting method for fitting a linear model comprises using the Theil-Sen robust linear fitting method.

9. The method as claimed in claim 1 wherein generating a set of synthetic orbital elements at an epoch time using the dynamical orbital model comprises calculating extrapolated orbital elements using the epoch time.

10. The method as claimed in claim 1, wherein the predefined terminal position is a position stored in a memory of the terminal apparatus.

11. The method as claimed in claim 1, wherein the terminal further comprises a satellite positioning system receiver, and the predefined terminal position is obtained from the satellite positioning system receiver.

12. The method as claimed in claim 1 wherein the set of orbital parameters comprises the Keplerian orbital parameters (a,e,i,$\Omega$,$\omega$,M), and the historical ephemeris data comprises a set of values of the orbital parameters (a[t],e[t],i[t],$\Omega$[t],$\omega$[t],M[t]) over a time period t=(t_1,t_2 . . . ,t_n), and the dynamical orbital model is configured to directly or indirectly fit at least orbital parameters ($\Omega$,$\omega$,M) and a mean motion of the satellite over the time period t, and the time point t_n is the time of the most recent orbital parameter data and the time period comprises at least the two weeks preceding and including t_n.

13. A method for generating extended satellite ephemeris data for a satellite for use by a terminal apparatus in a satellite communication system, wherein the satellite is a minimally controlled satellite, the method comprising:
receiving historical ephemeris data for a satellite, wherein the satellite is a minimally controlled satellite;
estimating a dynamical orbital model for generating one or more estimates of a temporal evolution of a set of orbital parameters for the satellite using the received historical ephemeris data;
storing the dynamical orbital model by the terminal apparatus or updating a dynamical orbital model stored by the terminal apparatus, wherein the dynamical orbital model is either received from a source external to the terminal apparatus or the dynamical orbital model is estimated by the terminal apparatus;
generating, by the terminal apparatus, a set of synthetic orbital elements at an epoch time using the dynamical orbital model, and
the terminal apparatus providing the set of synthetic orbital elements to an orbital predictor to obtain an estimate of one or more satellite pass times for a predefined terminal position, or one or more satellite locations at a predetermined future time,
wherein the set of orbital parameters is any set of parameters sufficient to model the motion of a minimally controlled satellite in orbit, and the dynamical orbital model is configured to directly or indirectly fit each orbital parameter,
wherein the set of orbital parameters comprises the Keplerian orbital parameters ($\alpha$, e, i, $\Omega$, $\omega$, M), and the historical ephemeris data comprises a set of values of the orbital parameters ($\alpha$[t], e[t], i[t], $\Omega$[t], $\omega$[t], M[t]) over a time period t=(t_1,t_2 . . . ,t_n),
wherein estimating a dynamical orbital model comprises fitting a model to the historical ephemeris data for orbital parameters ($\Omega$, $\omega$, M) and a mean motion of the satellite over the time period t, and using the value of the orbital parameter for the most recent time point (t_n) in time period t for each orbital parameter ($\alpha$, e, i), and
wherein the time point t_n is the time of the most recent orbital parameter data and the time period comprises at least the two weeks preceding and including t_n.

14. A method for generating extended satellite ephemeris data for a satellite for use by a terminal apparatus in a satellite communication system, wherein the satellite is a minimally controlled satellite, the method comprising:
receiving historical ephemeris data for a satellite, wherein the satellite is a minimally controlled satellite;
estimating a dynamical orbital model for generating one or more estimates of a temporal evolution of a set of orbital parameters for the satellite using the received historical ephemeris data;
storing the dynamical orbital model by the terminal apparatus or updating a dynamical orbital model stored by the terminal apparatus, wherein the dynamical orbital model is either received from a source external to the terminal apparatus or the dynamical orbital model is estimated by the terminal apparatus;
generating, by the terminal apparatus, a set of synthetic orbital elements at an epoch time using the dynamical orbital model, and
the terminal apparatus providing the set of synthetic orbital elements to an orbital predictor to obtain an estimate of one or more satellite pass times for a predefined terminal position, or one or more satellite locations at a predetermined future time,
wherein the epoch time is a time of the ascending node transit for the satellite occurring immediately before a predefined time period of interest.

15. The method as claimed in claim 14 further comprising:
performing a linear fit $\rho=m_\rho t+c_\rho$ for a mean motion p over a time period t=($t_1, t_2 \ldots, t_n$) to obtain a slope parameter $m_\rho$ and an offset $c_\rho$ and determining the time duration T for the satellite to complete the next K complete orbits since a time of the most recent orbital parameter data $t_n$ using $$T = \frac{\sqrt{c_\rho^2 + 2m_\rho K} - c_\rho}{m_\rho}$$

or T=K/$\rho$ for $m_\rho$=0; or
performing a linear fit for historical orbit number as a function of time to obtain an estimate of the number of complete orbits K and estimating the mean motion $\rho$ from the derivative of the orbit number with respect to time, and determining the time duration T for the satellite to complete the next K complete orbits since a time of the most recent orbital parameter data $t_n$ using the estimated mean motion $\rho$; and
determining the epoch time $T_{epoch}=t_n+T$ where $t_n$ is the time of the most recent orbital parameter data.

16. The method as claimed in claim 14 further comprising:
wherein the set of orbital parameters comprises the Keplerian orbital parameters (a,e,i,$\Omega$,$\omega$,M), and the historical ephemeris data comprises a set of values of the orbital parameters (a[t],e[t],i[t],Ω[t],ω[t],M[t]) over a time period t=(t_1,t_2 . . . ,t_n), and the dynamical orbital model is configured to directly or indirectly fit at least orbital parameters (Ω,ω,M) and a mean motion of the satellite over the time period t.

17. A terminal apparatus for use in a satellite communication system wherein the satellite is a minimally controlled satellite, the apparatus comprising:
at least one antenna;
a communications module configured to at least transmit data to the satellite using the at least one antenna;
at least one processor and a memory wherein the processor is configured to:
receive historical ephemeris data for a satellite, wherein the satellite is a minimally controlled satellite;
estimate a dynamical orbital model for generating one or more estimates of a temporal evolution of a set of orbital parameters for the satellite using the received historical ephemeris data;
store the dynamical orbital model in the memory, or update a dynamical orbital model stored by the memory, wherein the dynamical orbital model is either received from a source external to the terminal apparatus or the dynamical orbital model is estimated by the terminal apparatus;
generate a set of synthetic orbital elements at an epoch time using the dynamical orbital model, and
providing the set of synthetic orbital elements to an orbital predictor module to obtain an estimate of one or more satellite pass times for a predefined terminal position, or one or more satellite locations at a predetermined future time.

18. The terminal apparatus as claimed in claim 17 wherein the terminal apparatus receives historical ephemeris data via the communications module and is configured to estimate the dynamical orbital model.

19. The terminal apparatus as claimed in claim 17 further comprising a satellite positioning system receiver configured to provide a position estimate of the terminal apparatus to the orbital predictor module.

20. The terminal apparatus as claimed in claim 17 wherein the memory is configured to store an estimate of the position of the terminal apparatus and the processor is configured to provide the stored position to the orbital predictor module.

21. A terminal apparatus for use in a satellite communication system wherein the satellite is a minimally controlled satellite, the apparatus comprising:
at least one antenna;
a communications module configured to at least transmit data to the satellite using the at least one antenna;
an alarm module which receives an estimate of a satellite pass time period, and is configured to wake up the terminal apparatus during the estimated satellite pass time period; and
at least one processor and a memory wherein the processor is configured to:
receive historical ephemeris data for a satellite, wherein the satellite is a minimally controlled satellite;
estimate a dynamical orbital model for generating one or more estimates of a temporal evolution of a set of orbital parameters for the satellite using the received historical ephemeris data;
store the dynamical orbital model in the memory, or update a dynamical orbital model stored by the memory, wherein the dynamical orbital model is either received from a source external to the terminal apparatus or the dynamical orbital model is estimated by the terminal apparatus;
generate a set of synthetic orbital elements at an epoch time using the dynamical orbital model, and
providing the set of synthetic orbital elements to an orbital predictor module to obtain an estimate of one or more satellite pass times for a predefined terminal position, or one or more satellite locations at a predetermined future time.

22. The terminal apparatus as claimed in claim 21 wherein:
the set of orbital parameters comprises the Keplerian orbital parameters (a,e,i,Ω,ω,M), and the historical ephemeris data comprises a set of values of the orbital parameters (a[t],e[t],i[t],Ω[t],ω[t],M[t]) over a time period t=(t_1,t_2 . . . ,t_n), and the dynamical orbital model is configured to directly or indirectly fit at least orbital parameters (Ω,ω,M) and a mean motion of the satellite over the time period t.

23. The terminal apparatus as claimed in claim 21 wherein the terminal apparatus receives historical ephemeris data via the communications module and is configured to estimate the dynamical orbital model.

24. The terminal apparatus as claimed in claim 21 further comprising a satellite positioning system receiver configured to provide a position estimate of the terminal apparatus to the orbital predictor module.

25. The terminal apparatus as claimed in claim 21 wherein the memory is configured to store an estimate of the position of the terminal apparatus and the processor is configured to provide the stored position to the orbital predictor module.

26. A system comprising a computer apparatus and at least one terminal apparatus in a satellite communication system, wherein the computing apparatus comprises at least one processor and a memory, wherein the processor is configured to:
receive historical ephemeris data for a satellite, wherein the satellite is a minimally controlled satellite;
estimate a dynamical orbital model for generating one or more estimates of a temporal evolution of a set of orbital parameters for the satellite using the received historical ephemeris data;
sending the estimated dynamical model to the at least one terminal apparatus, wherein the at least terminal apparatus comprises at least one processor and a memory, wherein the processor is configured to:
store the dynamical orbital model in the memory, or to update a dynamical orbital model stored by the memory;
generate a set of synthetic orbital elements at an epoch time using the dynamical orbital model, and
provide the set of synthetic orbital elements to an orbital predictor module to obtain an estimate of one or more satellite pass times for a predefined terminal position, or one or more satellite locations at a predetermined future time.

27. A system comprising a computer apparatus and at least one terminal apparatus in a satellite communication system, wherein the computing apparatus comprises at least one processor and a memory, wherein the processor is configured to:
receive historical ephemeris data for a satellite, wherein the satellite is a minimally controlled satellite;
estimate a dynamical orbital model for generating one or more estimates of a temporal evolution of a set of orbital parameters for the satellite using the received historical ephemeris data wherein the set of orbital parameters comprises the Keplerian orbital parameters $(a,e,i,\Omega,\omega,M)$, and the historical ephemeris data comprises a set of values of the orbital parameters $(a[t],e[t],i[t], \Omega[t],\omega[t],M[t])$ over a time period $t=(t\_1, t\_2 \ldots ,t\_n)$, and the dynamical orbital model is configured to directly or indirectly fit each orbital parameters, and estimating a dynamical orbital model comprises fitting a model to the historical ephemeris data for orbital parameters $(\Omega,\omega,M)$ and a mean motion of the satellite over the time period t, and using the value of the orbital parameter for the most recent time point (t_n) in time period t for each orbital parameter (a,e,i) and the time point t_n is the time of the most recent orbital parameter data and the time period comprises at least the two weeks preceding and including t_n;

sending the estimated dynamical model to the at least one terminal apparatus, wherein the at least terminal apparatus comprises at least one processor and a memory, wherein the processor is configured to:

store the dynamical orbital model in the memory, or to update a dynamical orbital model stored by the memory;

generate a set of synthetic orbital elements at an epoch time using the dynamical orbital model, wherein the epoch time is a time of the ascending node transit for the satellite occurring immediately before a predefined time period of interest and provide the set of synthetic orbital elements to an orbital predictor module to obtain an estimate of one or more satellite pass times for a predefined terminal position, or one or more satellite locations at a predetermined future time.

* * * * *

UNITED STATES PATENT AND TRADEMARK OFFICE
CERTIFICATE OF CORRECTION

PATENT NO. : 10,877,158 B2
APPLICATION NO. : 16/472176
DATED : December 29, 2020
INVENTOR(S) : Alexander James Grant et al.

Page 1 of 1

It is certified that error appears in the above-identified patent and that said Letters Patent is hereby corrected as shown below:

In the Claims

Column 18, Claim 4, Line 54:
"$t=(t_1, t_2...t_n)$," should read: -- $t=(t_1, t_2..., t_n)$, --.

Column 18, Claim 5, Line 65:
"$t=(t_1, t_2...t_n)$" should read: -- $t=(t_1, t_2..., t_n)$ --.

Column 20, Claim 15, Line 41:
"motion p over" should read: -- motion ρ over --.

Column 20, Claim 15, Line 43:
"offset $c_p$ and" should read: -- offset $c_ρ$, and --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*